(12) United States Patent
Ishikawa et al.

(10) Patent No.: US 12,212,200 B2
(45) Date of Patent: Jan. 28, 2025

(54) MOTOR

(71) Applicant: NIDEC CORPORATION, Kyoto (JP)

(72) Inventors: Yuki Ishikawa, Kyoto (JP); Hiroyuki Abe, Kyoto (JP); Hironobu Kumagai, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 262 days.

(21) Appl. No.: 17/751,574

(22) Filed: May 23, 2022

(65) Prior Publication Data

US 2022/0393535 A1    Dec. 8, 2022

(30) Foreign Application Priority Data

Jun. 8, 2021  (JP) ................. 2021-096081

(51) Int. Cl.
| | | |
|---|---|---|
| *H02K 3/14* | (2006.01) | |
| *H02K 1/16* | (2006.01) | |
| *H02K 3/28* | (2006.01) | |

(52) U.S. Cl.
CPC ............ *H02K 3/14* (2013.01); *H02K 1/165* (2013.01); *H02K 3/28* (2013.01); *H02K 2213/03* (2013.01)

(58) Field of Classification Search
CPC .......... H02K 1/14; H02K 1/145; H02K 1/146; H02K 1/16; H02K 1/165; H02K 1/185; H02K 1/27; H02K 1/2706; H02K 3/02; H02K 3/04; H02K 3/12; H02K 3/14; H02K 3/18; H02K 3/28; H02K 3/32; H02K 5/24; H02K 13/02; H02K 13/04; H02K 15/0025;

(Continued)

(56) References Cited

U.S. PATENT DOCUMENTS

| | | | | |
|---|---|---|---|---|
| 6,198,190 B1* | 3/2001 | Umeda | ..................... | H02K 1/22 310/201 |
| 2015/0280507 A1* | 10/2015 | Kayano | ..................... | H02K 3/28 310/54 |
| 2017/0033630 A1* | 2/2017 | Tamura | ..................... | H02K 3/18 |

FOREIGN PATENT DOCUMENTS

| | | | | |
|---|---|---|---|---|
| DE | 112011105658 T5 | * | 8/2014 | ......... H02K 15/0062 |
| JP | 2009153367 A | | 7/2009 | |

(Continued)

OTHER PUBLICATIONS

WO2018180815A1—Translation (Year: 2024).*

(Continued)

*Primary Examiner* — Christopher M Koehler
*Assistant Examiner* — Ahmed F Seck
(74) *Attorney, Agent, or Firm* — HAUPTMAN HAM, LLP

(57) ABSTRACT

In a motor, a stator includes: a stator core having slots arranged in a circumferential direction; and conductor connection bodies with conductors connected in series and inserted into the slots. A conductor connection body includes: a first portion wave-wound toward one side in the circumferential direction from a first end to a second end; a second portion wave-wound toward the one side in the circumferential direction from a third end to a fourth end; and a folded portion connecting the first and second portions. The first and third ends protrude in an axial direction from different slots in the circumferential direction, and the second and fourth ends protrude in the axial direction from different slots in the circumferential direction. The conductors include a folded conductor that forms a folded portion connecting the second end of the first portion and the fourth end of the second portion.

12 Claims, 11 Drawing Sheets

(58) Field of Classification Search
CPC .......... H02K 15/0031; H02K 15/0037; H02K 15/0056; H02K 15/0062; H02K 15/0068; H02K 15/0081; H02K 15/0087; H02K 15/0414; H02K 15/0421; H02K 15/0428; H02K 15/0435; H02K 15/0042; H02K 15/045; H02K 15/0464; H02K 15/0478; H02K 15/0471; H02K 15/0485; H02K 15/062; H02K 15/063; H02K 15/064; H02K 15/065; H02K 15/066; H02K 15/067; H02K 15/08; H02K 15/085; H02K 17/10; H02K 17/12; H02K 17/14; H02K 17/16; H02K 19/06; H02K 19/10; H02K 19/103; H02K 19/12; H02K 19/14; H02K 19/26; H02K 23/08; H02K 23/26; H02K 23/28; H02K 23/30; H02K 23/32; H02K 23/34; H02K 23/36; H02K 27/02; H02K 27/04; H02K 27/12; H02K 27/14; H02K 2203/06; H02K 2213/03

See application file for complete search history.

(56) References Cited

FOREIGN PATENT DOCUMENTS

| | | | | | |
|---|---|---|---|---|---|
| JP | 2013162721 | A | * | 8/2013 | ............... H02K 3/12 |
| JP | 2022071979 | A | * | 5/2022 | ............. H02K 11/25 |
| WO | WO-2014174666 | A1 | * | 10/2014 | ............... H02K 1/12 |
| WO | 2017170060 | A1 | | 10/2017 | |
| WO | WO2018180815 | A1 | * | 10/2018 | ............. H02K 21/16 |

OTHER PUBLICATIONS

17751574_2024-09-11_DE_112011105658_T5_H.pdf (Year: 2024).*
17751574_2024-09-11_JP_2013162721_A_H.pdf (Year: 2024).*
17751574_2024-09-11_JP_2022071979_A_H.pdf (Year: 2024).*
17751574_2024-09-11_WO_2014174666_A1_H.pdf (Year: 2024).*

* cited by examiner

MOTOR

CROSS-REFERENCE TO RELATED APPLICATIONS

The present invention claims priority under 35 U.S.C. § 119 to Japanese Patent Application No. 2021-096081 filed on Jun. 8, 2021, the entire content of which is incorporated herein by reference.

FIELD OF THE INVENTION

The present invention relates to a motor.

BACKGROUND

In a motor for an electric vehicle, distributed winding is adopted for the purpose of reducing vibration and noise. A conventional a wave-wound stator uses a plurality of segment coils for the purpose of improving efficiency of the motor.

A long routing path of a conductor cannot be secured when wave winding of a conventional structure is performed. On the other hand, a folded portion is provided in the routing path of the wave-wound conductor, and the conductor is wave-wound in an opposite direction with the folded portion interposed therebetween, thereby lengthening the routing path of the conductor. However, a segment coil is non-circular and is significantly less flexible than a conductor using a general round wire. That is, because a shape of the folded portion is significantly different from that of the segment coil other than the folded portion, the segment coil of the folded portion has a large axial dimension in order to avoid other segment coils, which results in an increase in the axial dimension of the stator.

SUMMARY

An exemplary motor according to one aspect of the present invention includes: a rotor that is rotatable about a central axis; and a stator that is arranged radially outward of the rotor. The stator includes: a stator core having a plurality of slots arranged in a circumferential direction; and a plurality of conductor connection bodies which have a plurality of conductors connected in series and are inserted into the plurality of slots. The conductor connection body includes: a first portion wave-wound toward one side in a circumferential direction from a first end portion to a second end portion; a second portion wave-wound toward the one side in the circumferential direction from a third end portion to a fourth end portion; and a folded portion connecting the first portion and the second portion. The first end portion of the first portion and the third end portion of the second portion protrude in an axial direction from different slots in the circumferential direction, and the second end portion of the first portion and the fourth end portion of the second portion protrude in the axial direction from different slots in the circumferential direction. The plurality of conductors include a folded conductor that connects the second end portion of the first portion and the fourth end portion of the second portion and forms the folded portion.

The above and other elements, features, steps, characteristics and advantages of the present disclosure will become more apparent from the following detailed description of the preferred embodiments with reference to the attached drawings.

DETAILED DESCRIPTION

A Z-axis direction appropriately illustrated in each drawing is a vertical direction in which a positive side is an "upper side" and a negative side is a "lower side". A central axis J appropriately illustrated in each drawing is a virtual line that is parallel to the Z-axis direction and extends in the vertical direction. In the following description, an axial direction of the central axis J, that is, the direction parallel to the vertical direction is simply referred to as an "axial direction", the upper side is referred to as a "one side in the axial direction", and the lower side is referred to as the "other side in the axial direction". In addition, a radial direction centered on the central axis J is simply referred to as a "radial direction" in some cases. Furthermore, in some cases, the circumferential direction centered on the central axis J is simply referred to as the "circumferential direction", a counterclockwise direction when viewed from above is referred to as "one side θ1 in the circumferential direction", and a clockwise direction when viewed from above is referred to as "the other side θ2 in the circumferential direction".

The vertical direction, the upper side, and the lower side are merely names for describing an arrangement relationship between the respective units, and an actual arrangement relationship and the like may be other than the arrangement relationship indicated by these names. Furthermore, the directions described as one side in the axial direction and the other side in the axial direction can reproduce an effect of the preferred embodiment even when being replaced with each other. Similarly, the directions described as the one side θ1 in the circumferential direction and the other side θ2 in the circumferential direction can reproduce the effect of the preferred embodiment even when being replaced with each other.

Figure 1:
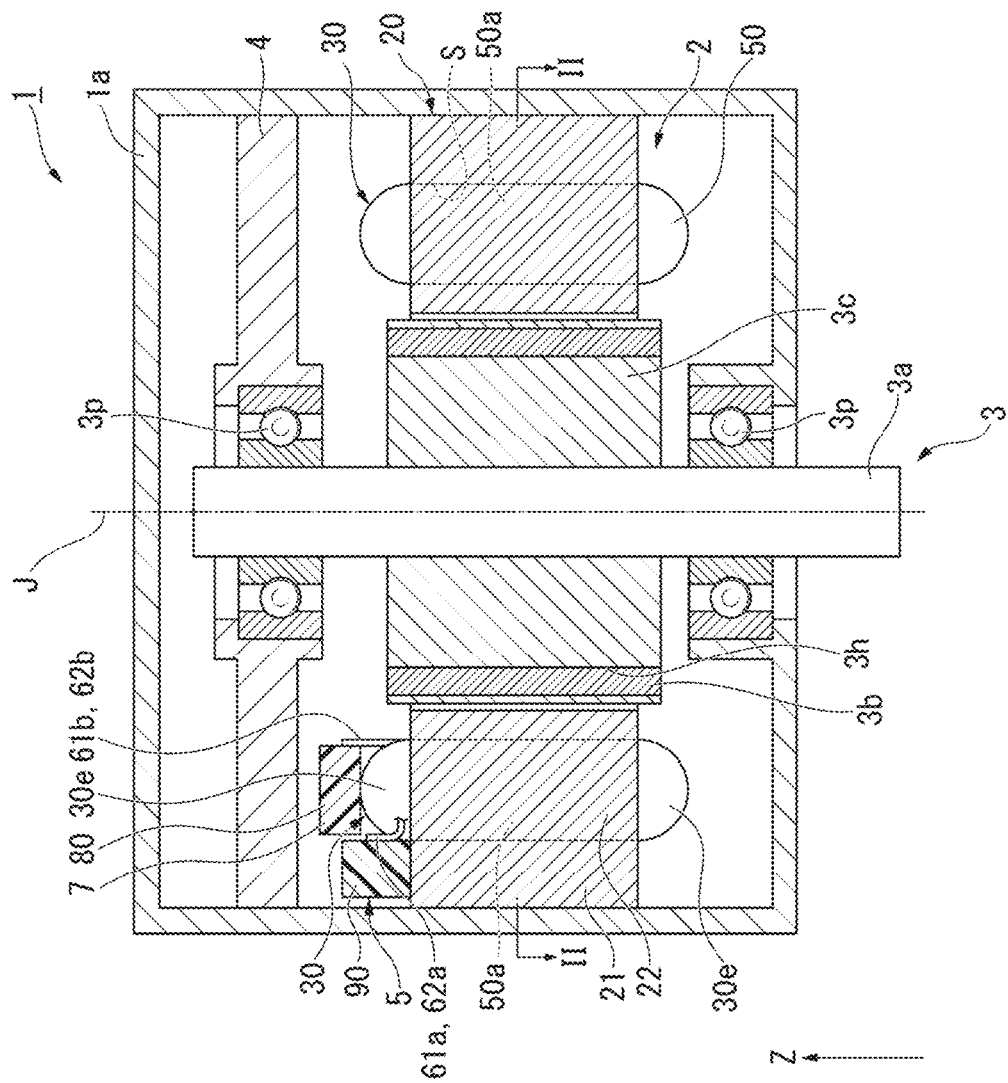
FIG. 1 is a schematic sectional view illustrating a motor according to an embodiment.

FIG. 1 is a schematic sectional view illustrating a motor 1 according to the present preferred embodiment.

The motor 1 of the present preferred embodiment is an inner-rotor motor. In addition, the motor 1 of the present preferred embodiment is a three-phase AC motor. The center of the motor 1 is the central axis J. The motor 1 includes a rotor 3, a stator 2, a bearing holder 4, and a housing 1a accommodating these parts.

The rotor 3 is rotatable about the central axis J. The rotor 3 is arranged radially inward of the stator 2 having an annular shape. That is, the rotor 3 opposes the stator 2 in the radial direction. The rotor 3 includes a shaft 3a, a rotor magnet 3b, and a rotor core 3c.

The shaft 3a extends in the axial direction along the central axis J. The shaft 3a has a columnar or substantially columnar shape that is centered on the central axis J and extends in the axial direction. The shaft 3a is supported by two bearings 3p so as to be rotatable about the central axis J.

Figure 2:
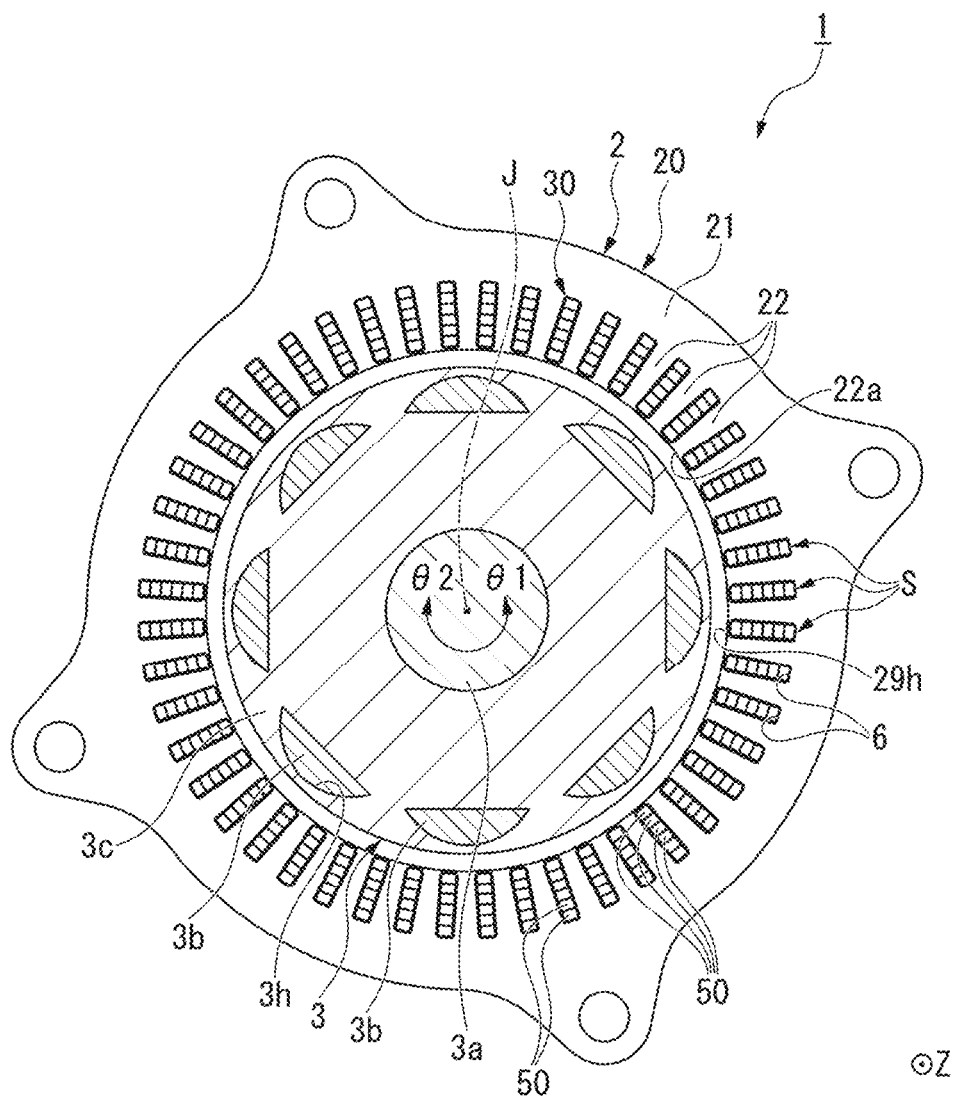
FIG. 2 is a sectional view illustrating the motor taken along a line II-II of FIG. 1.

FIG. 2 is a sectional view illustrating the motor 1 taken along a line II-II of FIG. 1.

The rotor core 3c is formed by laminating magnetic steel plates. The rotor core 3c has a tubular or substantially tubular shape extending in the axial direction. An inner peripheral surface of the rotor core 3c is fixed to an outer peripheral surface of the shaft 3a. The rotor core 3c has a holding hole 3h into which the rotor magnet 3b is inserted and fixed.

The rotor magnet 3b opposes the stator 2 in the radial direction. The rotor magnet 3b is held in a state of being embedded in the rotor core 3c. The rotor magnet 3b of the present preferred embodiment has eight poles. The number of poles of the rotor 3 is not limited to that in the present preferred embodiment. The rotor magnet 3b may be a magnet of another form such as an annular ring magnet.

As illustrated in FIG. 1, the stator 2 opposes the rotor 3 in the radial direction with a gap interposed therebetween. In the present preferred embodiment, the stator 2 is arranged radially outward of the rotor 3. The stator 2 includes a stator core 20, a winding portion 30, a plurality of insulating sheets 6, a bus bar unit 5, and a conductor holder 80.

The stator core 20 has an annular shape centered on the central axis J as illustrated in FIG. 1. The stator core 20 includes electromagnetic steel plates laminated along the axial direction. The stator core 20 includes: a core back 21 having a cylindrical or substantially cylindrical shape centered on the central axis J; and a plurality of teeth 22 extending radially inward from the core back 21.

The plurality of teeth 22 are arranged at regular intervals in the circumferential direction. An umbrella 22a is provided at a radially inward tip portion of the tooth 22. The umbrellas 22a protrude to both the sides in the circumferential direction from the teeth 22. That is, a circumferential dimension of the umbrella 22a is larger than a circumferential dimension of the tooth 22. A surface of the umbrella 22a facing radially inward opposes an outer peripheral surface of the rotor 3 in the radial direction with a gap interposed therebetween.

The winding portion 30 is mounted on the tooth 22. A slot S is provided between the teeth 22 adjacent to each other in the circumferential direction. That is, the stator core 20 has a plurality of the slots S arranged in the circumferential direction.

Conductors 50 of the winding portion 30 are accommodated in the slot S. The insulating sheets 6 are arranged one by one in the slots S. The insulating sheets 6 secure insulation between the winding portion 30 and the stator core 20 in the slot S.

One slot S has six layers arranged in the radial direction. In one slot, one conductor 50 is arranged on each layer. In the slot S, six conductors 50 are arranged in a row along the radial direction.

The slot S includes an opening 29h that is open radially inward. The opening 29h is located between the umbrellas 22a located at the tips of the adjacent teeth 22. A width dimension of the opening 29h along the circumferential direction is smaller than a dimension of the conductor 50 along the circumferential direction. For this reason, the conductor 50 hardly passes through the opening 29h, and the conductor 50 is prevented from being separated from the stator core 20.

In the present preferred embodiment, the stator core 20 has 48 teeth 22. That is, the stator 2 of the present preferred embodiment has 48 slots. The number of slots of the stator 2 is appropriately set according to the number of poles of the rotor magnet 3b and a method for winding the winding portion 30.

Figure 3:
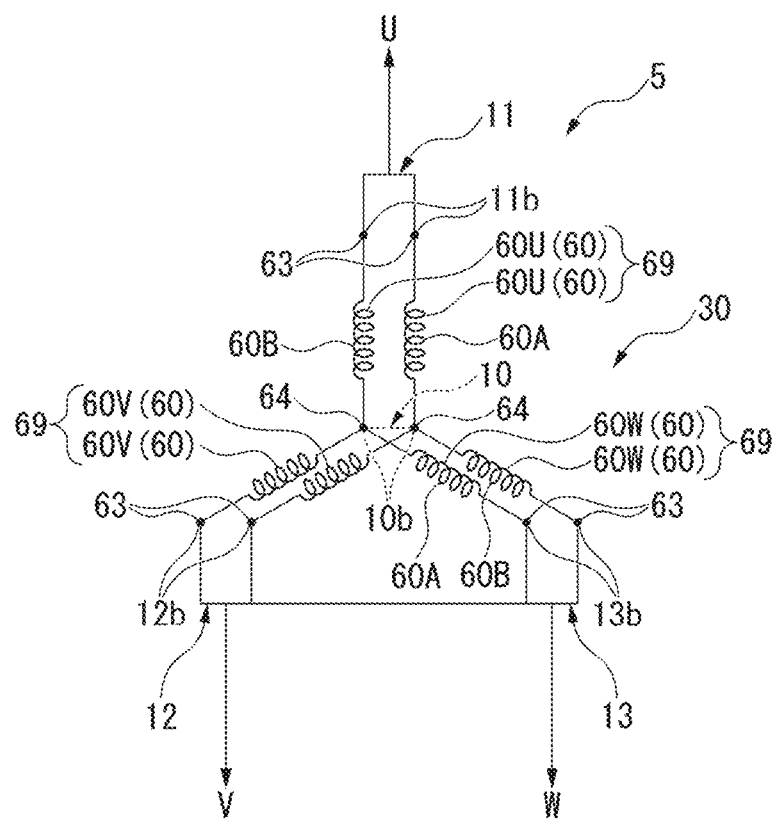
FIG. 3 is a schematic diagram illustrating a circuit configured by a winding portion and a bus bar unit of the embodiment.

FIG. 3 is a schematic diagram illustrating a circuit configured by the winding portion 30 and the bus bar unit 5 of the present preferred embodiment.

The winding portion 30 of the present preferred embodiment includes a plurality of (six in the present preferred embodiment) conductor connection bodies 60 and forms a segment coil. The six conductor connection bodies 60 are classified into two U-phase conductor connection bodies 60U, two V-phase conductor connection bodies 60V, and two W-phase conductor connection bodies 60W. That is, the plurality of conductor connection bodies 60 are classified into a plurality of phases. In addition, the plurality of conductor connection bodies 60 include a plurality of conductor connection bodies 60 having the same phase.

Although described in detail later, the bus bar unit 5 includes three phase bus bars 11, 12, and 13 and one neutral point bus bar 10. The three phase bus bars 11, 12, and 13 are classified into a U-phase bus bar 11, a V-phase bus bar 12, and a W-phase bus bar 13.

The U-phase conductor connection body 60U, the V-phase conductor connection body 60V, and the W-phase conductor connection body 60W are Y-connected by the neutral point bus bar 10 and the phase bus bars 11, 12, and 13. In the present preferred embodiment, two Y-connections corresponding to the two conductor connection bodies 60 of each phase are configured, and the Y-connections are connected in parallel. That is, the winding portion 30 is configured with the two Y-connections by the bus bar unit 5.

In the present preferred embodiment, the description has been given regarding the case where the winding portion 30 includes the six conductor connection bodies 60 having the three phases, two of the conductor connection bodies having the same phase. However, if the winding portion 30 includes at least two conductor connection bodies 60 having the same phase and these conductor connection bodies 60 form a connection body pair 69 passing through the adjacent slots S in the circumferential direction, a winding configuration similar to that of the present preferred embodiment can be obtained. Accordingly, the plurality of conductor connection bodies 60 only need to have Y-connections of 2×M with M as a natural number (M=2 in the present preferred embodiment).

The conductor connection body 60 includes a first end 63 and a second end 64. The first end 63 and the second end 64 are provided at one end and the other end of the conductor connection body 60, respectively. The conductor connection body 60 is mounted on the stator core 20 between the first end 63 and the second end 64 to form a coil of each phase. The conductor connection body 60 is connected to the bus bar unit 5 in the first end 63 and the second end 64.

The second ends 64 of the two U-phase conductor connection bodies 60U, the two V-phase conductor connection bodies 60V, and the two W-phase conductor connection bodies 60W are connected to the one neutral point bus bar 10. Thus, the second ends 64 of the six conductor connection bodies 60 become the same potential and form a neutral point. That is, the neutral point bus bar 10 forms the neutral point of the three-phase circuit.

The first ends 63 of the two U-phase conductor connection bodies 60U are connected to the U-phase bus bar 11. The first ends 63 of the two V-phase conductor connection bodies 60V are connected to the V-phase bus bar 12. The first ends 63 of the two W-phase conductor connection bodies 60W are connected to the W-phase bus bar 13. Alternating currents having phases shifted from each other by 120° are caused to flow through the phase bus bars 11, 12, and 13.

Two conductor connection bodies 60 having the same phase pass through the adjacent slots S and are mounted on the stator core 20. In this specification, two conductor connection bodies 60 passing through the adjacent slots S are referred to as the connection body pair 69. In the following description, in a case where two conductor connection bodies 60 forming the connection body pair 69 are distinguished from each other, one is referred to as a first conductor connection body 60A and the other is referred to as a second conductor connection body 60B.

Figure 4:
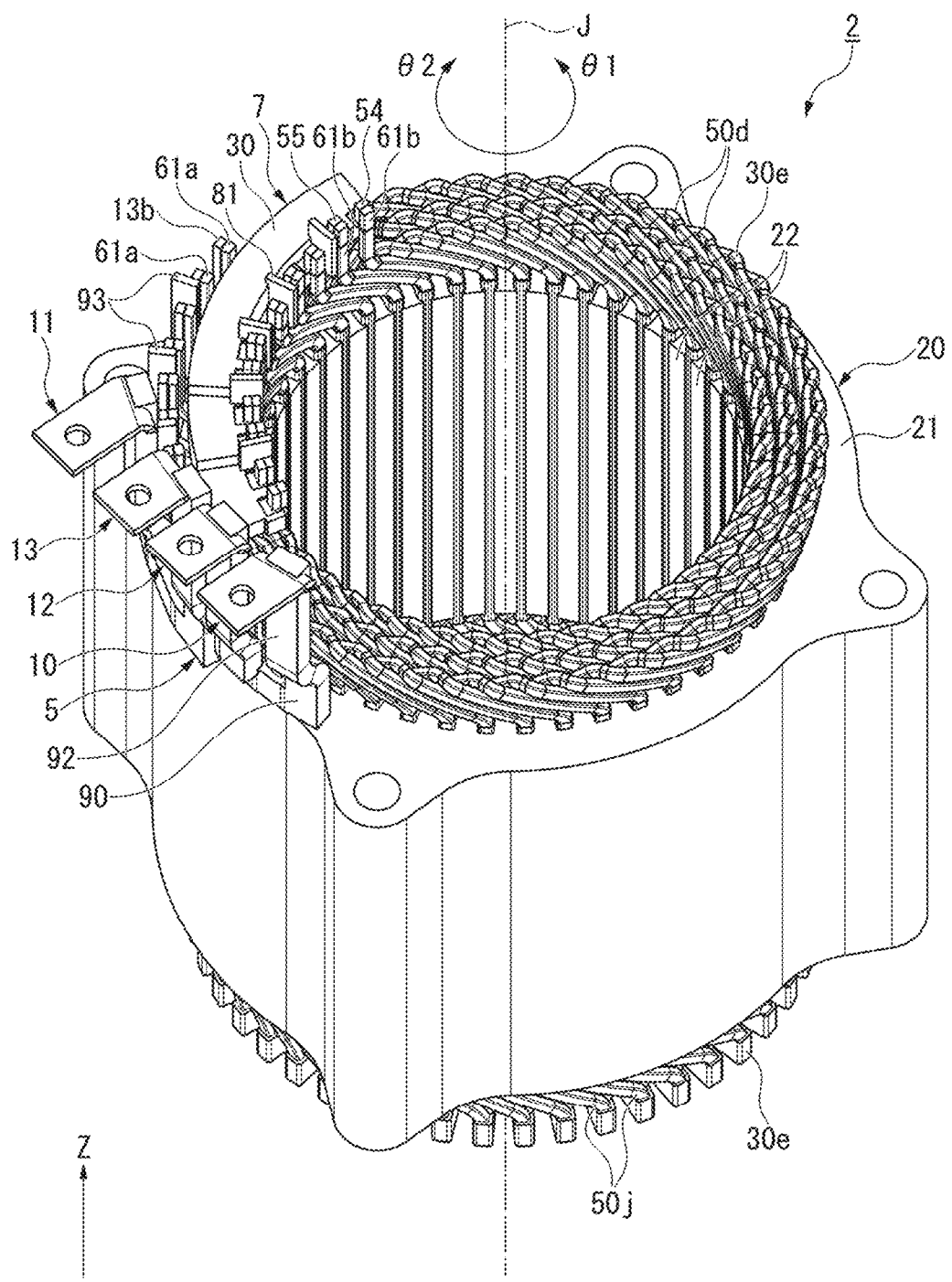
FIG. 4 is a perspective view of a stator according to the preferred embodiment.
Figure 5:
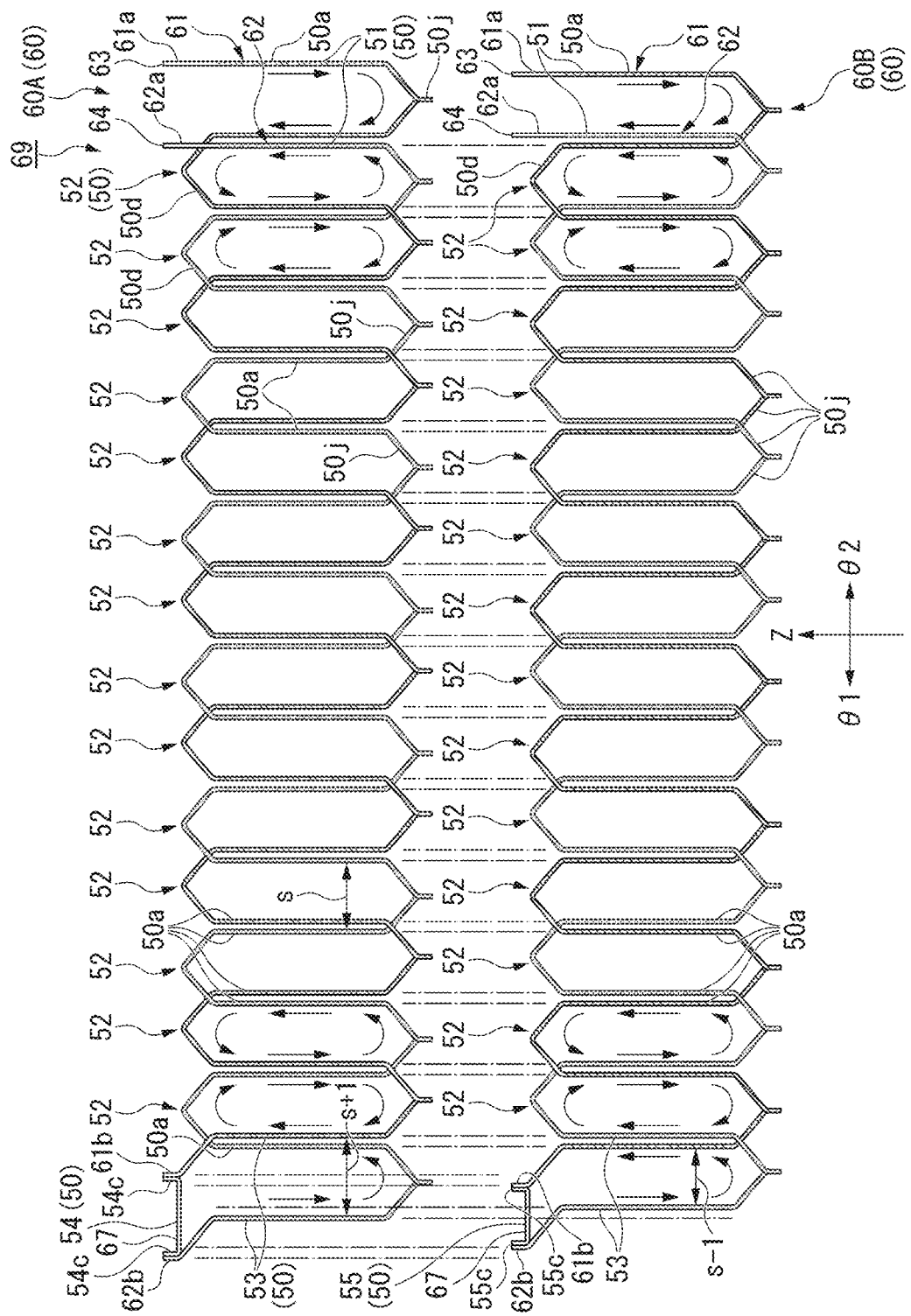
FIG. 5 is a schematic diagram illustrating a winding configuration of the conductor connection body of the preferred embodiment.

FIG. 4 is a perspective view of the stator 2 of the present preferred embodiment. FIG. 5 is a schematic view illustrating a winding configuration of two conductor connection bodies 60 forming the connection body pair 69.

As illustrated in FIG. 5, the conductor connection body 60 is configured by connecting the plurality of conductors 50 in series. The conductor connection bodies 60 are inserted into the plurality of slots S and routed in a wave or substantially wave shape.

The plurality of conductors 50 constituting the conductor connection body 60 are classified into a first end portion conductor 51, a hairpin conductor 52, a second end portion conductor 53, and folded conductors 54 and 55. That is, the plurality of conductors 50 include the first end portion conductor 51, the hairpin conductor 52, the second end portion conductor 53, and the folded conductors 54 and 55.

Among the various conductors 50, the conductors 50 (the first end portion conductor 51, the hairpin conductor 52, and the second end portion conductor 53) excluding the folded conductors 54 and 55 pass through the slot S in a straight portion 50a to be described later. These conductors 50 passing through the slot S are formed by bending a flat wire. Therefore, a space factor of the conductor 50 in the slot S can be improved as compared with a case of using a round wire. In this specification, the "flat wire" is a wire rod having a quadrangular sectional shape or a substantially quadrangular sectional shape. In this specification, the term "substantially square shape" includes a square shape with rounded corners in which the corners of the square shape are rounded. Although not illustrated, the conductor 50 in the present preferred embodiment has an enamel coating on the surface.

Among the various conductors 50, each of the conductors 50 excluding the folded conductors 54 and 55 has: at least the straight portion 50a extending straight along the axial direction (Z-direction) and a connection portion 50j located in an end portion on the lower side (the other side in the axial direction). The straight portion 50a passes through the slot S. That is, the conductor connection body 60 is accommodated in the slot S in the straight portion 50a. The conductor connection body 60 extends to the upper side and the lower side of the stator core 20 in a region other than the straight portion 50a. The portions extending from the upper side and the lower side of the stator core 20 form coil ends 30e (see FIG. 1) of the stator core 20.

The connection portion 50j is connected to the connection portion 50j of another conductor 50. The connection portions 50j of the pair of conductors 50 are joined to each other by joining means such as welding. The connection portion 50j is bent in the circumferential direction after the conductor 50 is mounted on the stator core 20, and the connection portion 50j is joined to the connection portion 50j of another conductor 50. In the conductor 50 before being mounted on the stator core 20, the connection portion 50j has a straight or substantially straight shape continuous to the straight portion 50a. The conductor 50 is attached to the stator core 20 by inserting the connection portion 50j and the straight portion 50a into the slot S from the upper side (one side in the axial direction) of the stator core 20. The connection portion 50j of the conductor 50 is bent in the circumferential direction and joined to another connection portion 50j, thereby being prevented from being axially detached from the stator core 20.

The plurality of conductors 50 are inserted into the slots S of the stator core 20 from the upper side and joined on the lower side, whereby the stator 2 of the present preferred embodiment can be assembled. For this reason, a complicated assembly process is not required, and an assembly process can be simplified.

Next, the various conductors 50 will be described.

The first end portion conductor 51 has one first end portion 61a or one third end portion 62a, one straight portion 50a, and one connection portion 50j. The first end portion 61a and the third end portion 62a are located in upper end portions of the first end portion conductors 51. The first end portion 61a and the third end portion 62a extend by extending the straight portion 50a upward. In the first end portion conductor 51, the connection portion 50j extends from a lower end of the straight portion 50a to the one side θ1 in the circumferential direction.

Two first end portion conductors 51 are provided in one conductor connection body 60. Accordingly, one first end portion 61a and one third end portion 62a are provided in one conductor connection body 60. The first end portion 61a and the third end portion 62a are ends forming both end portions of the conductor connection body 60. Between the first end portion 61a and the third end portion 62a of the conductor connection body 60, the first end portion 61a is the first end 63, and the third end portion 62a is the second end 64. Any one of the U-phase bus bar 11, the V-phase bus bar 12, and the W-phase bus bar 13 is connected to the first end 63. The neutral point bus bar 10 is connected to the second end 64.

The hairpin conductor 52 includes two straight portions 50a, two connection portions 50j, and one crossing portion 50d. The crossing portion 50d is arranged at an upper end portion of the hairpin conductor 52. The crossing portion 50d extends across the two straight portions 50a. That is, the two straight portions 50a are connected to each other through the crossing portion 50d in the hairpin conductor 52. In the hairpin conductor 52, the two connection portions 50j are connected to lower ends of the straight portions 50a different from each other. A plurality of the crossing portions 50d protrude from an end surface on the upper side (one side in the axial direction) of the stator core 20.

In the hairpin conductor 52, the two straight portions 50a are arranged with the number of slots per pole s. Here, the number of slots per pole s means the number of slots S of the stator 2 arranged within one magnetic pole of the rotor 3 in the combination of the rotor 3 and the stator 2. The number of slots per pole s is calculated by (the total number of slots in the stator 2)/(the number of magnetic poles in the rotor 3). In the present preferred embodiment, the number of magnetic poles of the rotor 3 is eight, and the number of slots of the stator 2 is 48, so that the number of slots per pole s is six. In the hairpin conductor 52, the two straight portions 50a are separated from each other by six slots in the circumferential direction.

In the hairpin conductor 52, the two connection portions 50j are bent in opposite directions in the circumferential direction. Between the two connection portions 50j, one located on the one side θ1 in the circumferential direction extends from the lower end of the straight portion 50a to the one side θ1 in the circumferential direction, and the other located on the other side θ2 in the circumferential direction extends from the lower end of the straight portion 50a to the other side θ2 in the circumferential direction. Each of the first conductor connection body 60A and the second conductor connection body 60B includes six hairpin conductors 52.

The second end portion conductor 53 has one second end portion 61b or one fourth end portion 62b, one straight portion 50a, and one connection portion 50j. The second end portion 61b and the fourth end portion 62b are located at upper end portions of the second end portion conductors 53. The second end portion 61b and the fourth end portion 62b are bent in the circumferential direction from the straight portion 50a. In the second end portion conductor 53, the second end portion 61b, the fourth end portion 62b, and the connection portion 50j extend from the straight portion 50a in a direction opposite to the circumferential direction. In the second end portion conductor 53, the second end portion 61b and the fourth end portion 62b extend from the upper end of the straight portion 50a to the one side θ1 in the circumferential direction, and the connection portion 50j extends from the lower end of the straight portion 50a to the other side θ2 in the circumferential direction.

Two second end portion conductors 53 are provided in one conductor connection body 60. Accordingly, one second end portion 61b and one fourth end portion 62b are provided in one conductor connection body 60. The second end portion 61b and the fourth end portion 62b provided in one conductor connection body 60 are connected by the folded conductors 54 and 55.

The folded conductors 54 and 55 are classified into a first folded conductor 54 used for the first conductor connection body 60A and a second folded conductor 55 used for the second conductor connection body 60B. Accordingly, anyone folded conductor 54 or 55 of the first folded conductors 54 and the second folded conductor 55 is provided in one conductor connection body 60.

In the first conductor connection body 60A, the first folded conductor 54 connects the second end portion 61b and the fourth end portion 62b. Similarly, in the second conductor connection body 60B, the second folded conductor 55 connects the second end portion 61b and the fourth end portion 62b. A distance between the second end portion 61b and the fourth end portion 62b is different between the first conductor connection body 60A and the second conductor connection body 60B. In the first conductor connection body 60A, the second end portion 61b and the fourth end portion 62b are arranged in the circumferential direction with the number of slots per pole s+1 (seven slots in the present preferred embodiment). On the other hand, in the second conductor connection body 60B, the second end portion 61b and the fourth end portion 62b are arranged in the circumferential direction with the number of slots per pole s−1 (five slots in the present preferred embodiment). For this reason, the first folded conductor 54 has a larger crossing amount in the circumferential direction by two slots than the second folded conductor 55.

Specific shapes of the folded conductors 54 and 55 will be described in detail later with reference to FIG. 7 and the like.

Next, winding configurations of the first conductor connection body 60A and the second conductor connection body 60B will be described.

The first conductor connection body 60A is wave-wound every six slots toward the one side θ1 in the circumferential direction from the first end 63 to the first folded conductor 54. In addition, the first conductor connection body 60A is wave-wound every six slots toward the one side θ1 in the circumferential direction from the second end 64 to the first folded conductor 54.

Here, in the first conductor connection body 60A, a region that is wave-wound toward the one side θ1 in the circumferential direction between the first end 63 and the first folded conductor 54 is referred to as a first portion 61. In addition, in the first conductor connection body 60A, a region that is wave-wound toward the one side θ1 in the circumferential direction between the second end 64 and the first folded conductor 54 is referred to as a second portion 62. Furthermore, an end portion of the first portion 61 on the other side θ2 in the circumferential direction is referred to as the first end portion 61a. An end portion of the second portion 62 on the other side θ2 in the circumferential direction is referred to as the third end portion 62a. An end portion of the first portion 61 on the one side θ1 in the circumferential direction is referred to as the second end portion 61b. An end portion of the second portion 62 on the one side θ1 in the circumferential direction is referred to as the fourth end portion 62b. In addition, in the first conductor connection body 60A, a portion connecting the first portion 61 and the second portion 62 is referred to as the folded portion 67. The first conductor connection body 60A includes: the first portion 61 that is wave-wound toward the one side θ1 in the circumferential direction from the first end portion 61a to the second end portion 61b; the second portion 62 that is wave-wound toward the one side θ1 in the circumferential direction from the third end portion 62a to the fourth end portion 62b; and the folded portion 67 connecting the first portion 61 and the second portion 62. The folded portion 67 of the first conductor connection body 60A is configured using the first folded conductor 54.

The second conductor connection body 60B is wave-wound every six slots toward the one side θ1 in the circumferential direction from the first end 63 to the second folded conductor 55. In addition, the second conductor connection body 60B is wave-wound every six slots toward the one side θ1 in the circumferential direction from the second end 64 to the second folded conductor 55. The second conductor connection body 60B has the first portion 61, the second portion 62, and the folded portion 67, which is similar to the first conductor connection body 60A. That is, the second conductor connection body 60B includes: the first portion 61 that is wave-wound toward the one side θ1 in the circumferential direction from the first end portion 61a to the second end portion 61b; the second portion 62 that is wave-wound toward the one side θ1 in the circumferential direction from the third end portion 62a to the fourth end portion 62b; and the folded portion 67 connecting the first portion 61 and the second portion 62. The folded portion 67 of the second conductor connection body 60B is configured using the second folded conductor 55.

In the single conductor connection body 60, the first portion 61 and the second portion 62 are wave-wound so as to pass through different slots S. Accordingly, the first end portion 61a of the first portion 61 and the third end portion 62a of the second portion 62 protrude in the axial direction from different slots S in the circumferential direction. The second end portion 61b of the first portion 61 and the fourth end portion 62b of the second portion 62 protrude in the axial direction from different slots S in the circumferential direction. Each of the folded conductors 54 and 55 connects the second end portion 61b and the fourth end portion 62b extending from the different slots S.

In the present preferred embodiment, the first portion 61 of the first conductor connection body 60A and the second portion 62 of the second conductor connection body 60B pass through the same slot S. Similarly, the second portion 62 of the first conductor connection body 60A and the first portion 61 of the second conductor connection body 60B pass through the same slot S.

In the present preferred embodiment, all of the first end portion 61a, the second end portion 61b, the third end portion 62a, and the fourth end portion 62b protrude upward (to the one side in the axial direction) from the stator core 20. Accordingly, the bus bars 10, 11, 12, and 13 connected to the first end portions 61a and the third end portions 62a are arranged above the stator core 20. The folded conductors 54 and 55 connected to the second end portions 61b and the fourth end portions 62b are arranged above the stator core 20.

The conductor connection body 60 of the present preferred embodiment is wave-wound with the number of slots per pole s in the first portion 61 and the second portion 62. That is, the conductor connection body 60 is mounted on the stator core 20 by full pitch winding. For this reason, all of the plurality of conductors 50 arranged in the same slot S form a part of the conductor connection body 60 having the same phase according to the present preferred embodiment. According to the present preferred embodiment, it is unnecessary to insulate the conductor connection bodies 60 having different phases in one slot S, and the insulation is easily secured.

In the conductor connection body 60 of the present preferred embodiment, the folded portion 67 is configured using the single conductor 50. That is, the plurality of conductors 50 include the folded conductors 54 and 55 forming the folded portions 67. Each of the folded conductors 54 and 55 connect the second end portion 61b of the first portion 61 and the fourth end portion 62b of the second portion 62 on the upper side of the stator core 20.

Figure 11:
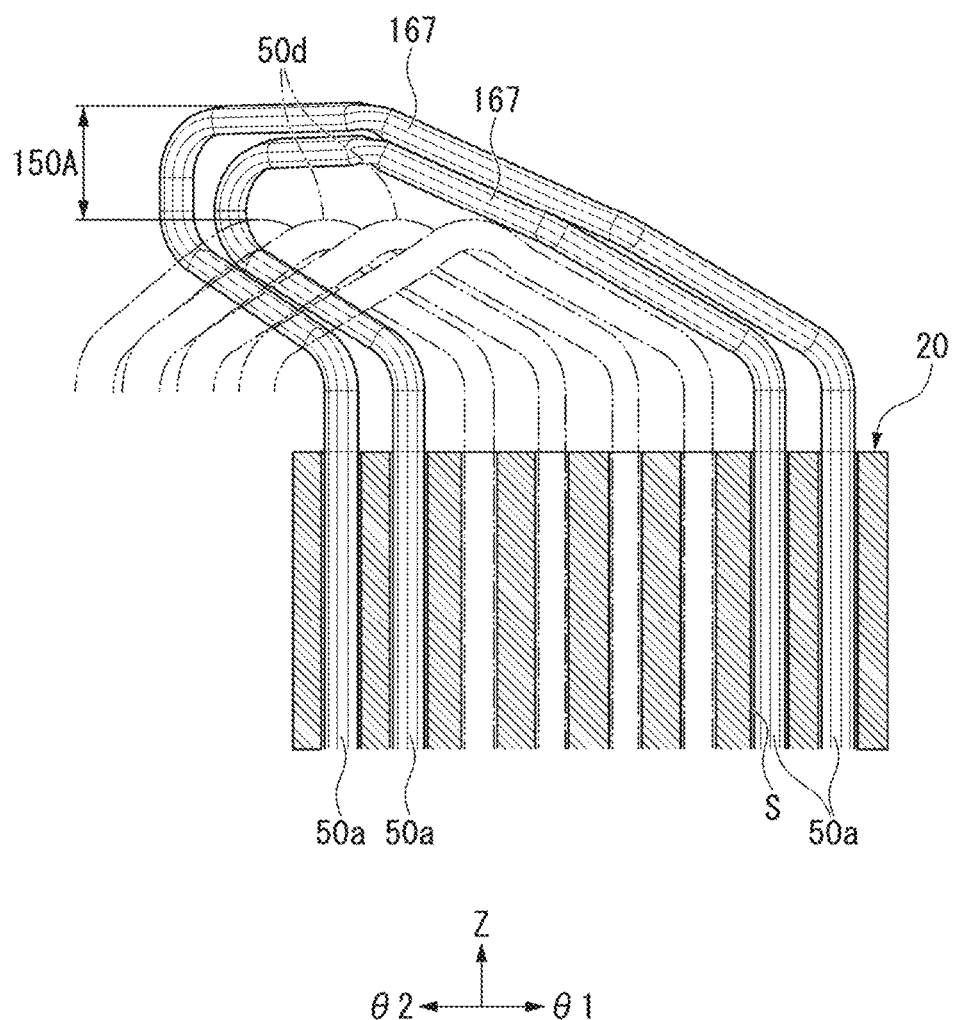
FIG. 11 is a schematic view illustrating a folded portion according to a comparative embodiment.

Here, as a conventional structure, FIG. 11 schematically illustrates folded portions 167 according to a comparative embodiment. The folded portion 167 of the comparative embodiment is configured as a part of a hairpin-shaped conductor. Each of the folded portions 167 of the comparative embodiment extends upward from a straight portion 50a. For this reason, the folded portion 167 of the comparative embodiment has a retracted region 150A, which protrudes above a crossing portion 50d, above an upper end portion of the crossing portion 50d and above the crossing portion 50d in order to prevent interference with the crossing portion 50d of another conductor 50. In addition, the folded portion 167 of the comparative embodiment extends along an inclination direction of the crossing portion 50d in a region below the retracted region 150A in order to prevent the interference with the crossing portion 50d. The crossing portion 50d is inclined to the one side θ1 in the circumferential direction as proceeding upward. For this reason, the folded portion 167 has the hairpin shape that makes a U-turn from the one side θ1 in the circumferential direction to the other side θ2 in the circumferential direction in the retracted region 150A. As described above, the folded portion 167 of the comparative embodiment have a large protrusion height with respect to the crossing portion 50d of the retracted region 150A. In addition, the folded portion 167 of the comparative embodiment needs to have the hairpin shape, which is complicated, in the retracted region 150A, and has a problem that an assembling process tends to be difficult.

On the other hand, according to the present preferred embodiment, the folded portion 67 is constituted by the folded conductors 54 and 55 configured as the single conductor 50 in the conductor connection body 60. The folded conductors 54 and 55 do not pass through the inside of the slot S. For this reason, a process of passing the folded conductors 54 and 55 through the inside of the slot S does not occur in a process of assembling the winding portion 30 to the stator core 20. As a result, even when the folded conductors 54 and 55 are formed in a complicated shape, it is possible to prevent the assembling process of the winding portion 30 from being complicated.

Since the folded conductors 54 and 55 of the conductor connection body 60 of the present preferred embodiment can be divided from the other conductors 50, the folded conductors 54 and 55 can be shortened and be formed in a simple shape. Thus, the folded conductors 54 and 55 can be manufactured at low cost, and the motor 1 can be manufactured at low cost.

In the present preferred embodiment, the winding portion 30 has the first portion 61 and the second portion 62 having the plurality of crossing portions 50d and connection portions 50j. The plurality of crossing portions 50d form the coil end 30e above the stator core 20. On the other hand, the connection portions 50j form the coil end 30e on the lower side of the stator core 20.

The first end portion 61a of the first portion 61 and the third end portion 62a of the second portion 62 are arranged above the stator core 20 on the outermost periphery of the coil end 30e. That is, the first end portion 61a and the third end portion 62a are located radially outward of the plurality of crossing portions 50d. The first end portions 61a of the first portions 61 extend upward (to the one side in the axial direction) from the stator core 20 and are connected to the phase bus bars 11, 12, and 13. Similarly, the third end portions 62a of the second portion 62 extend upward (to the one side in the axial direction) from the stator core 20 and are connected to the neutral point bus bar 10. According to the present preferred embodiment, since the first end portion 61a of the first portion 61 and the third end portion 62a of the second portion 62 are arranged on the outermost periphery of the coil end 30e, the bus bar unit 5 can be arranged radially outward of the coil end 30e. Thus, a vertical dimension of the motor 1 can be reduced as compared with a case where the bus bar unit 5 is arranged above the coil end 30e.

In addition, the second end portion 61b of the first portion 61 and the fourth end portion 62b of the second portion 62 are arranged above the stator core 20 on the innermost periphery of the coil end 30e. That is, the second end portion 61b and the fourth end portion 62b are located radially inward of the plurality of crossing portions 50d. For this reason, the folded conductor 54 is connected to the second end portion 61b and the fourth end portion 62b at the innermost periphery of the coil end 30e. According to the present preferred embodiment, a process of joining the folded conductor 54 with the second end portion 61b and the fourth end portion 62b can be performed from the radially inner side of the coil end 30e, and the joining process can be easily performed.

Figure 6:
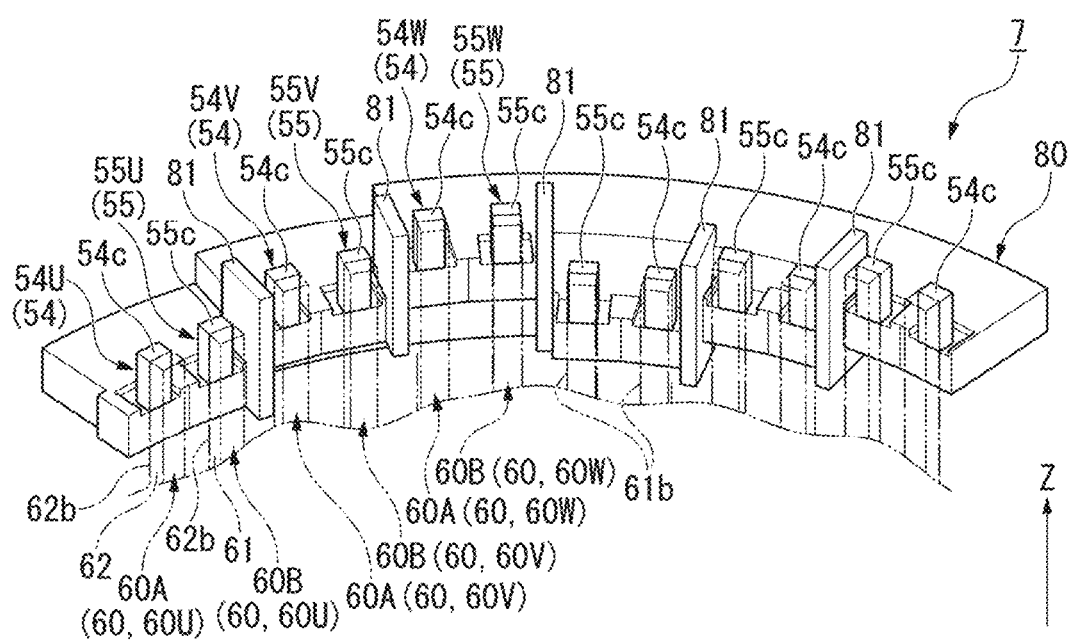
FIG. 6 is a perspective view of a conductor unit of the preferred embodiment.

FIG. 6 is a perspective view of the conductor holder 80 and the plurality of folded conductors 54 and 55. FIG. 7 is a perspective view of the plurality of folded conductors 54 and 55.

The conductor holder 80 and the plurality of folded conductors 54 and 55 illustrated in FIG. 6 constitute a conductor unit 7. That is, the conductor unit 7 includes the conductor holder 80 and the plurality of folded conductors 54 and 55.

The winding portion 30 of the present preferred embodiment is provided with six conductor connection bodies 60. For this reason, the winding portion 30 is provided with six folded conductors 54 and 55. The six folded conductors 54 and 55 are supported by one conductor holder 80.

As illustrated in FIG. 4, the conductor unit 7 is located above the stator core 20. The conductor unit 7 is located further above the coil end 30e located above the stator core 20. The conductor unit 7 overlaps the coil end 30e when viewed from the axial direction.

Figure 7:
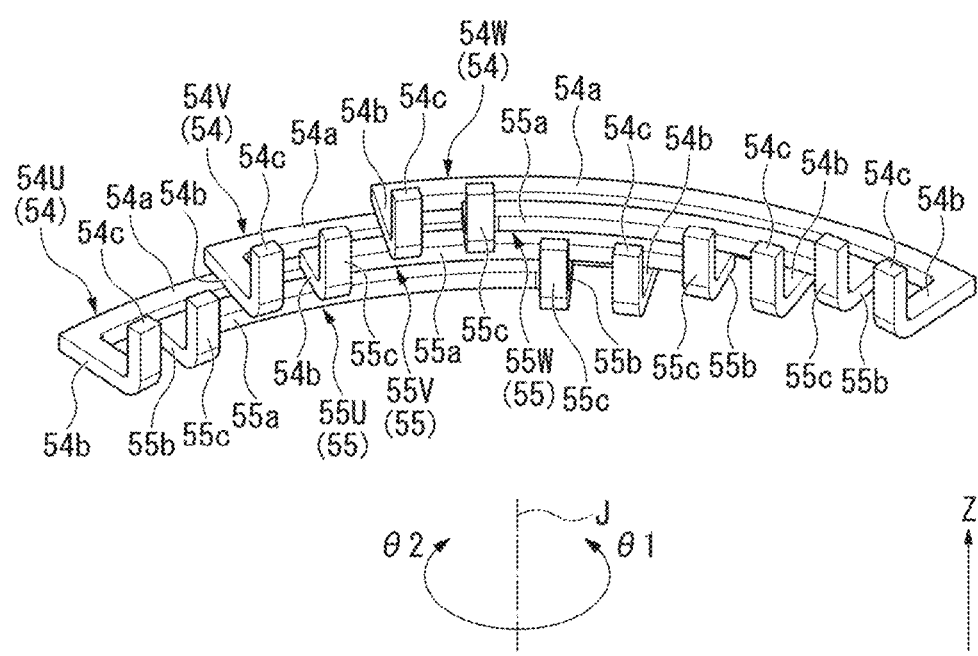
FIG. 7 is a perspective view illustrating a plurality of folded conductors of the preferred embodiment.

As illustrated in FIG. 7, the six folded conductors 54 and 55 include three first folded conductors 54 and three second folded conductors 55. The three first folded conductors 54 are the folded portions 67 of the U-phase, V-phase, and W-phase conductor connection bodies 60, respectively. Similarly, the three second folded conductors 55 are the folded portions 67 of the U-phase, V-phase, and W-phase conductor connection bodies 60, respectively.

In the following description, a first U-phase folded conductor 54 is sometimes referred to as a first U-phase conductor 54U, and a second U-phase folded conductor 55 is sometimes referred to as a second U-phase conductor 55U. Similarly, a first V-phase folded conductor 54 is sometimes referred to as a first V-phase conductor 54V, and a second V-phase folded conductor 55 is sometimes referred to as a second V-phase conductor 55V. Furthermore, a first W-phase folded conductor 54 is sometimes referred to as a first W-phase conductor 54W, and a second W-phase folded conductor 55 is sometimes referred to as a second W-phase conductor 55W.

As described with reference to FIG. 5, the first folded conductor 54 straddles the seven (which is the number of slots per pole s+1) slots S, and the second folded conductor 55 straddles the five (which is the number of slots per pole s−1) slots S. Furthermore, two slots S from which the first folded conductor 54 extends are arranged on the circumferentially outer side of two slots S from which the second folded conductor 55 extends. As illustrated in FIG. 7, the first folded conductor 54 is arranged so as to straddle the second folded conductor 55 from the radially outer side and both sides in the circumferential direction. As illustrated in FIG. 5, between the two in-phase conductor connection bodies 60 passing through the adjacent slots S, one (the second conductor connection body 60B) extends between slots S separated by s−1 from each other in the second folded conductor 55, and the other (the first conductor connection body 60A) extends between slots S separated by s+1 from each other in the first folded conductor 54. Furthermore, the other (first conductor connection body 60A) passes through one side (the radially outer side in the present preferred embodiment) radially outward of the second folded conductor 55 of the one (second conductor connection body 60B) in the first folded conductor 54. Thus, the first folded conductor 54 and the second folded conductor 55 can be prevented from increasing in size in the axial and radial directions while preventing mutual interference.

As illustrated in FIG. 7, the first folded conductor 54 includes one conductor main body portion 54a, two radially extending portions 54b, and two connection terminals 54c. Similarly, the second folded conductor 55 includes one conductor main body portion 55a, two radially extending portions 55b, and two connection terminals 55c.

The folded conductors 54 and 55 may be molded by a forming process of a flat wire similarly to the other conductors 50. In addition, the folded conductors 54 and 55 may be molded by press working of a plate material similarly to the bus bars 10, 11, 12, and 13 to be described later. The folded conductors 54 and 55 of the present preferred embodiment do not pass through the slot S. For this reason, the folded conductors 54 and 55 can adopt a processing method such as press working in which an unstable cross-sectional shape is formed, and the motor 1 can be manufactured at low cost. That is, the folded conductors 54 and 55 may have a plate or substantially plate shape in the present preferred embodiment. In this case, the folded conductors 54 and 55 can be formed by press working. It is possible to perform easy press forming of the folded conductors 54 and 55 by defining the axial direction as the plate thickness direction in the conductor main body portions 54a and 55a and the radially extending portions 54b and 55b and defining the radial direction as the plate thickness direction in the connection terminals 54c and 55c.

In the folded conductors 54 and 55, the conductor main body portions 54a and 55a extend along the circumferential direction. The radially extending portions 54b and 55b are provided at both end portions of the conductor main body portions 54a and 55a, respectively. The radially extending portions 54b and 55b extend radially inward from the conductor main body portions 54a and 55a, respectively. The connection terminals 54c and 55c are provided at radially inner end portions of the radially extending portions 54b and 55b, respectively. That is, the connection terminals 54c and 55c connected to the other conductors 50 are provided at both end portions of the folded conductors 54 and 55. The connection terminals 54c and 55c extend upward from the radially extending portions 54b and 55b, respectively.

Each of the conductor main body portions 54a and 55a of the first folded conductor 54 and the second folded conductor 55 extends in an arc or substantially arc shape centered on the central axis J. The conductor main body portions 54a of the three first folded conductors 54 (that is, the first U-phase conductor 54U, the first V-phase conductor 54V, and the first W-phase conductor 54W) are arranged on the same circumference when viewed from the axial direction. Similarly, the conductor main body portions 55a of the three second folded conductors 55 (that is, the second U-phase conductor 55U, the second V-phase conductor 55V, and the second W-phase conductor 55W) are arranged on the same circumference. A diameter of the circumference of the first folded conductor 54 on which the conductor main body portion 54a is arranged is larger than a diameter of the circumference of the second folded conductor 55 on which the conductor main body portion 55a is arranged. Accordingly, the conductor main body portion 54a of the first folded conductor 54 passes through the radially outer side of the conductor main body portion 55a of the second folded conductor 55.

The first U-phase conductor 54U and the second U-phase conductor 55U are arranged at the same height in the vertical direction. Similarly, the first V-phase conductor 54V and the second V-phase conductor 55V are arranged at the same height in the vertical direction. The first W-phase conductor 54W and the second W-phase conductor 55W are arranged at the same height in the vertical direction. The conductor main body portions 54a and 55a are arranged in the order of the U-phase, the V-phase, and the W-phase toward the upper side. That is, the V-phase and W-phase conductor main body portions 54a are arranged immediately above the U-phase conductor main body portion 54a, and the V-phase and W-phase conductor main body portions 55a are arranged immediately above the U-phase conductor main body portion 55a. The W-phase conductor main body portion 54a is arranged immediately above the V-phase conductor main body portion 54a, and the W-phase conductor main body portion 55a is arranged immediately above the V-phase conductor main body portion 55a.

In this specification, "directly above" means that at least a part is overlapped when viewed from the upper side and the vertical direction.

According to the present preferred embodiment, at least parts of the folded conductors 54 and 55 of different phases overlap each other when viewed from the axial direction. For this reason, a space in which the plurality of folded conductors 54 and 55 are arranged can be downsized in the circumferential direction and the radial direction as compared with a case where folded conductors of different phases are arranged side by side in the circumferential direction or the radial direction. As a result, the stator 2 can be downsized. In addition, the plurality of folded conductors 54 and 55 can be densely arranged in the circumferential direction and the radial direction, and thus, the conductor holder 80 holding the plurality of folded conductors 54 and 55 can be downsized, and the weight of the stator 2 can be reduced.

According to the present preferred embodiment, the folded conductors 54 and 55 are arranged at different heights for each phase, and thus, the folded conductors 54 and 55 of different phases can have the same shape. Furthermore, the folded conductors 54 and 55 of different phases are arranged to be shifted in the circumferential direction in the present preferred embodiment, and thus, the connection terminals 54c and 55c of different phases can be arranged to be separated from each other in the circumferential direction. That is, the folded conductors 54 and 55 of different phases have the same shape and are arranged to be shifted from each other in the circumferential direction in the present preferred embodiment. More specifically, the first U-phase conductor 54U, the first V-phase conductor 54V, and the first W-phase conductor 54W of the present preferred embodiment have the same shape. Similarly, the second U-phase conductor 55U, the second V-phase conductor 55V, and the second W-phase conductor 55W of the present preferred embodiment have the same shape. According to the present preferred embodiment, components having the same shape can be used as the folded conductors 54 and 55 of the respective phases, an increase in the number of components constituting the winding portion 30 can be suppressed, and the stator 2 can be manufactured at low cost.

According to the present preferred embodiment, the folded conductors 54 and 55 of different phases are arranged in a stepwise manner when viewed from the radial direction by being shifted in the circumferential direction and the axial direction. That is, the U-phase, V-phase, and W-phase folded conductors 54 and 55 are arranged side by side from the lower side to the upper side and from the one side θ1 in the circumferential direction to the other side θ2 in the circumferential direction. Thus, the folded conductors 54 and 55 of different phases can be partially overlapped and densely arranged with the connection terminals 54c and 55c of different phases arranged to be separated from each other in the circumferential direction, and the conductor unit 7 can be downsized.

As described above, one conductor main body portion 54a between the in-phase folded conductors 54 and 55 is arranged radially outward of the other conductor main body portion 55a. Accordingly, the in-phase folded conductors 54 and 55 overlap each other in the radial direction in the conductor main body portions 54a and 55a in the present preferred embodiment. That is, the in-phase folded conductors 54 and 55 are arranged at the same height. When all the folded conductors 54 and 55 are laminated in the axial direction, the axial dimension increases. On the other hand, when the in-phase folded conductors 54 and 55 among the plurality of folded conductors 54 and 55 are arranged to overlap each other in the radial direction, the space in which the folded conductors 54 and 55 are arranged can be prevented from becoming too large in the axial direction, and the motor 1 can be downsized.

According to the present preferred embodiment, the folded conductors 54 and 55 are arranged immediately above the coil end 30e. The folded conductors 54 and 55 are arranged radially outward of the second end portion 61b and the fourth end portion 62b to be connected, respectively, and overlap each other in the axial direction. For this reason, the amount of the protrusion to the upper side from the coil end 30e can be suppressed as compared with the case where the folded portion 167 is retracted upward as in the comparative embodiment of FIG. 11. Thus, the motor 1 can be downsized.

As illustrated in FIG. 6, the connection terminals 54c and 55c of the folded conductors 54 and 55 are exposed from the conductor holder 80. The second end portion 61b of the first portion 61 or the fourth end portion 62b of the second portion 62 is connected to the connection terminals 54c and 55c. The connection terminals 54c and 55c, the second end portion 61b, and the fourth end portion 62b all extend along the axial direction. The connection terminals 54c and 55c, and the second end portion 61b oppose and come into contact with each other in the radial direction, and are electrically and mechanically connected to each other. The connection terminals 54c and 55c, and the fourth end portion 62b oppose and come into contact with each other in the radial direction, and are electrically and mechanically connected to each other.

The conductor unit 7 is provided with a total of twelve connection terminals 54c and 55c. All the connection terminals 54c and 55c of the conductor unit 7 are arranged on the same circumference centered on the central axis J. Thus, in the process of joining the connection terminals 54c and 55c with the second end portion 61b or the fourth end portion 62b, a joining jig (for example, an electrode pair for resistance welding) and the stator 2 can be continuously joined while being relatively rotated about the central axis J, and the takt time in the joining process can be shortened.

The conductor holder 80 is made of an insulating resin member. The conductor holder 80 is molded by insert molding of partially embedding the folded conductors 54 and 55. More specifically, the conductor holder 80 embeds the conductor main body portions 54a and 55a and the radially extending portions 54b and 55b of the folded conductors 54 and 55, and exposes the connection terminals 54c and 55c. Thus, the conductor holder 80 holds the folded conductors 54 and 55 of the plurality of conductor connection bodies 60.

The conductor holder 80 has a plurality of (five in the present preferred embodiment) walls 81. The wall 81 extends along the radial direction and the axial direction. The plurality of walls 81 are arranged along the circumferential direction. In the conductor unit 7, two U-phase connection terminals 54c and 55c, two V-phase connection terminals 54c and 55c, and two W-phase connection terminals 54c and 55c are arranged side by side in the circumferential direction. The walls 81 are arranged between the U-phase connection terminal 55c and the V-phase connection terminal 54c, between the V-phase connection terminal 55c and the W-phase connection terminal 54c, and between the W-phase connection terminal 55c and the U-phase connection terminal 54c, respectively.

According to the present preferred embodiment, the wall 81 of the conductor holder 80 is arranged between the connection terminals 54c and 55c of the folded conductors 54 and 55 of different phases. Thus, the wall 81 can enhance the insulation between the connection terminals 54c and 55c of different phases, and can enhance the reliability of the conductor unit 7.

Figure 9:
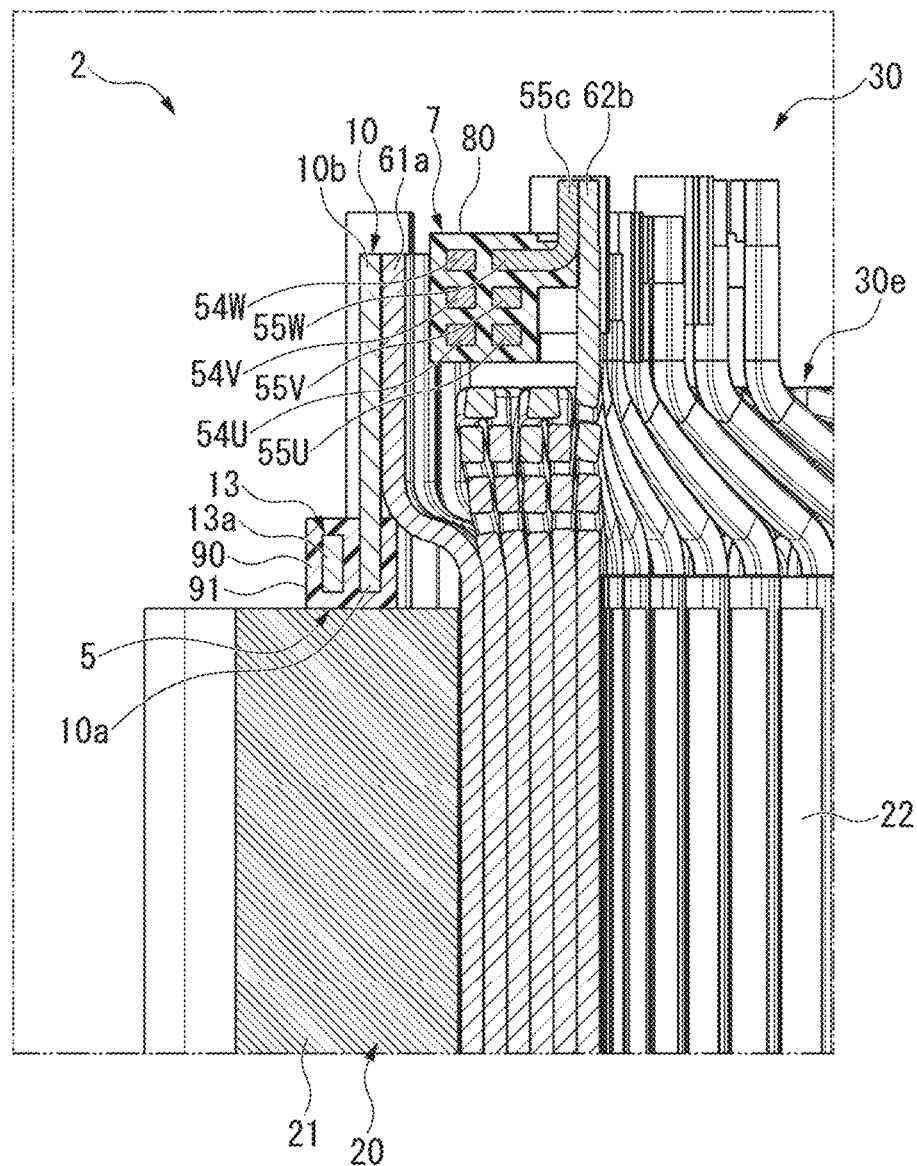
FIG. 9 is a sectional view of a portion of the motor of the preferred embodiment.

FIG. 9 is a sectional view of a portion of the motor 1 of the preferred embodiment. Note that a sectional line in FIG. 9 passes through the first end portion 61a and the fourth end portion 62b of the conductor connection body 60.

The plurality of folded conductors 54 and 55 are arranged between the first end portion 61a and the third end portion 62a and between the second end portion 61b and the fourth end portion 62b in the radial direction. That is, the plurality of folded conductors 54 and 55 are arranged between the first end portion 61a and the second end portion 61b in the radial direction. Thus, the bus bars 10, 11, 12, and 13 connected to the first end portion 61a and the third end portion 62a and the folded conductors 54 and 55 connected to the second end portion 61b and the fourth end portion 62b can be arranged to be concentrated in the circumferential direction and the axial direction, and the motor 1 can be downsized. In addition, joint portions of the bus bars 10, 11, 12, and 13 with the first end portion 61a and the third end portion 62a and joint portions of the folded conductors 54 and 55 with the second end portion 61b and the fourth end portion 62b can be arranged to be close in the circumferential direction. For this reason, in the process of joining the joint portions (for example, the welding process), the moving distance of the joining jig can be shortened, and the takt time in the joining process can be shortened.

Circumferential positions of the plurality of folded conductors 54 and 55 overlap a circumferential position of the first end portion 61a, a circumferential position of the second end portion 61b, a circumferential position of the third end portion 62a, and an axial position of the fourth end portion 62b. Furthermore, axial positions of the plurality of folded conductors 54 and 55 overlap the circumferential position of the first end portion 61a, an axial position of the second end portion 61b, an axial position of the third end portion 62a, and the axial position of the fourth end portion 62b. For this reason, the conductor unit 7 can be arranged to be compact with respect to the coil end 30e.

As illustrated in FIG. 4, the bus bar unit 5 is arranged above the stator 2. More specifically the bus bar unit 5 is arranged on the upper side of the core back 21 radially outward of the coil end 30e. Accordingly, the bus bar unit 5 opposes the coil end 30e in the radial direction. The bus bar unit 5 is connected to the first end portion 61a and the third end portion 62a of the conductor connection body 60 extending from the coil end 30e.

Figure 8:
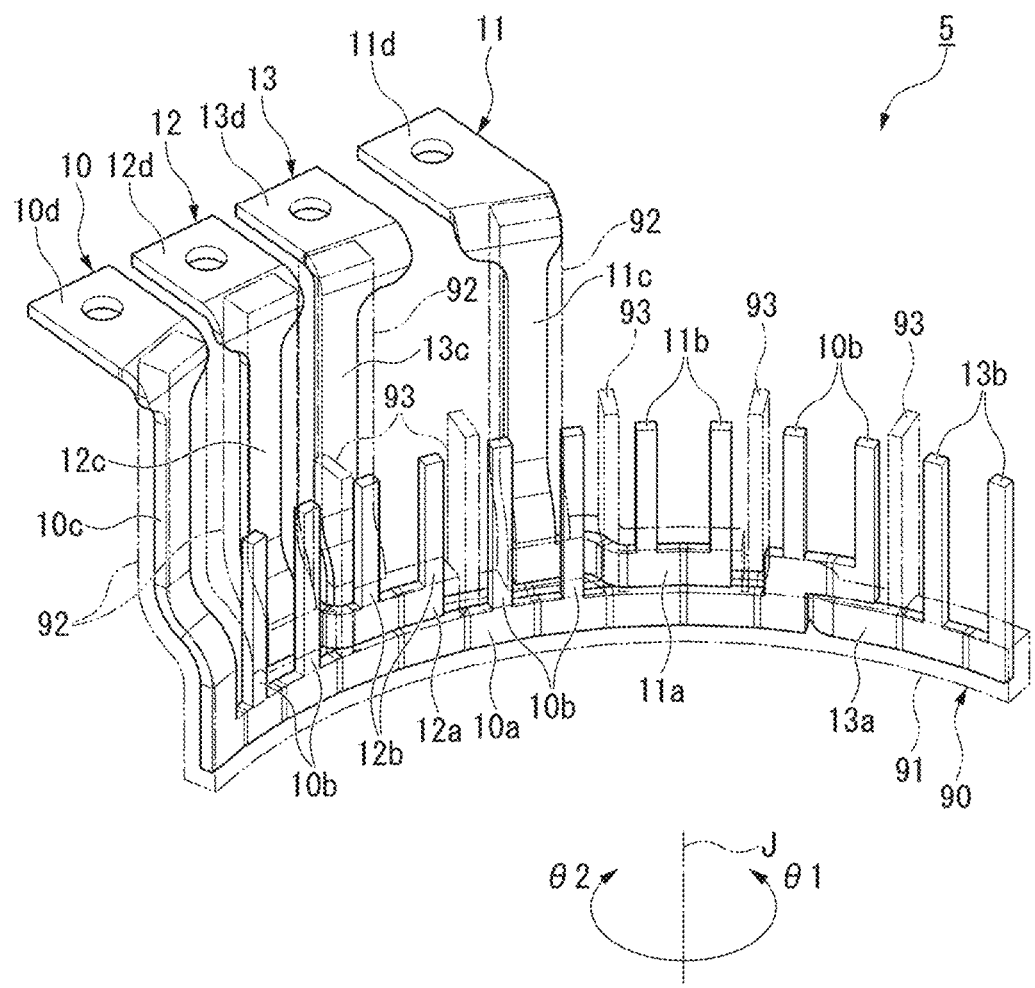
FIG. 8 is a perspective view illustrating the bus bar unit of the preferred embodiment.

FIG. 8 is a perspective view of the bus bar unit 5. In FIG. 8, a bus bar holder 90 of the bus bar unit 5 is indicated by a two-dot chain line.

The bus bar unit 5 includes the neutral point bus bar 10, the plurality of phase bus bars 11, 12, and 13, and the bus bar holder 90. That is, the stator 2 includes the neutral point bus bar 10, the plurality of phase bus bars 11, 12, and 13, and the bus bar holder 90. The neutral point bus bar 10 is connected to the first end portion 61a of the first portion 61, and the phase bus bars 11, 12, and 13 are connected to the third end portions 62a of the second portion 62 (see FIG. 5).

The neutral point bus bar 10 and the phase bus bars 11, 12, and 13 have a plate or substantially shape with the radial direction as the plate thickness direction. The neutral point bus bar 10 and the phase bus bars 11, 12, and 13 are formed by press working. The neutral point bus bar 10 and the phase bus bars 11, 12, and 13 extend along the circumferential direction.

As illustrated in FIG. 8, the neutral point bus bar 10 is arranged radially inward of the phase bus bars 11, 12, and 13. The neutral point bus bar 10 includes a neutral point bus bar main body portion 10a, a plurality of (six in the present preferred embodiment) neutral point connection portions 10b, an upper extending portion 10c, and an external connection terminal 10d.

The neutral point bus bar main body portion 10a extends in an arcuate or substantially arcuate shape centered on the central axis J when viewed from the axial direction. The neutral point bus bar main body portion 10a has the radial direction as the plate thickness direction.

The upper extending portion 10c of the neutral point bus bar 10 extends upward from an end portion of the neutral point bus bar main body portion 10a on the one side θ1 in the circumferential direction. The external connection terminal 10d is arranged at an upper end of the upper extending portion 10c. The external connection terminal 10d extends along a plane orthogonal to the central axis J. An external terminal (not illustrated) connected to an inverter is connected to the external connection terminal 10d.

The neutral point connection portion 10b protrudes upward from the neutral point bus bar main body portion 10a. The plurality of neutral point connection portions 10b are arranged on the same circumference centered on the central axis J. The neutral point connection portion 10b extends in the vertical direction with a uniform width. Shapes of all the neutral point connection portions 10b coincide with each other. The second end 64 extending radially outward from the coil end 30e is connected to each of the neutral point connection portions 10b by joining means such as welding. That is, the neutral point bus bar 10 is connected to the second end 64 of the conductor connection body 60 at the neutral point connection portion 10b (see FIG. 3).

The phase bus bars 11, 12, and 13 include phase bus bar main body portions 11a, 12a, and 13a, a plurality of (two in the present preferred embodiment) phase connection portions 11b, 12b, and 13b, upper extending portions 11c, 12c, and 13c, and external connection terminals 11d, 12d, and 13d, respectively.

The phase bus bar main body portions 11a, 12a, and 13a of the phase bus bars 11, 12, and 13 have mutually different shapes. Each of the phase bus bar main body portions 11a, 12a, and 13a of the three phase bus bars 11, 12, and 13 has at least apart overlapping the neutral point bus bar 10 radially outward or axially.

In the phase bus bars 11, 12, and 13, the phase connection portions 11b, 12b, and 13b protrude upward from the phase bus bar main body portions 11a, 12a, and 13a. The plurality of phase connection portions 11b, 12b, and 13b are arranged on the same circumference centered on the central axis J. The phase connection portions 11b, 12b, and 13b extend in the vertical direction with a uniform width. Shapes of all the phase connection portions 11b, 12b, and 13b coincide with each other. The phase connection portions 11b, 12b, and 13b have the same shape with the neutral point connection portion 10b. Each of the phase connection portions 11b, 12b, and 13b is joined with the first end 63 extending radially outward from the coil end 30e by joining means such as welding (see FIG. 3).

In the present preferred embodiment, axial positions of all the phase connection portions 11b, 12b, and 13b of all the phase bus bars 11, 12, and 13 and the neutral point connection portion 10b overlap each other. The phase connection portions 11b, 12b, and 13b and the neutral point connection portion 10b are connected to the first end portion 61a (first end 63) or the third end portion 62a (second end 64) by joining means such as welding. According to the present preferred embodiment, the axial positions of all the phase connection portions 11b, 12b, and 13b and the neutral point connection portion 10b coincide with each other. Thus, the phase connection portions 11b, 12b, and 13b and the neutral point connection portion 10b can be joined without moving a joining device used for each joining means, such as an electrode pair for resistance welding, in the axial direction. As a result, the joining process can be simplified.

In the present preferred embodiment, all the phase connection portions 11b, 12b, and 13b of all the phase bus bars 11, 12, and 13 and the neutral point connection portion 10b are arranged on the same circumference centered on the central axis J. Thus, in the process of joining the phase connection portions 11b, 12b, and 13b and the neutral point connection portion 10b with the first end portion 61a and the third end portion 62a, it is possible to continuously perform joining while relatively rotating the joining jig and the stator 2 about the central axis J. Thus, the takt time of the joining process can be shortened, and as a result, the joining process can be simplified.

The upper extending portions 11c, 12c, and 13c of the phase bus bars 11, 12, and 13 extend upward from end portions of the phase bus bar main body portions 11a, 12a, and 13a on the one side θ1 in the circumferential direction. The external connection terminals 11d, 12d, and 13d are arranged at upper ends of the upper extending portions 11c, 12c, and 13c. The external connection terminal 10d extends along a plane orthogonal to the central axis J. External terminals (not illustrated) that apply U-phase, V-phase, and W-phase voltages are connected to the external connection terminals 11d, 12d, and 13d, respectively.

In the present preferred embodiment, the neutral point bus bar 10 and the phase bus bars 11, 12, and 13 are arranged to overlap each other in the radial direction. For this reason, even when sectional areas are increased by widening the neutral point bus bar 10 and the phase bus bars 11, 12, and 13, a radial dimension is not increased. According to the motor 1 of the present preferred embodiment, the increase in the radial dimension can be prevented while increasing the sectional areas of the neutral point bus bar 10 and the phase bus bars 11, 12, and 13 in response to an increase in current. In particular, according to the present preferred embodiment, the neutral point bus bar 10 and the phase bus bars 11, 12, and 13 have a plate or substantially plate shape with the radial direction as the plate thickness direction. For this reason, the neutral point bus bar 10 and the phase bus bars 11, 12, and 13 are arranged to overlap each other in the radial direction, so that the increase in the radial dimension can be effectively prevented.

(Bus Bar Holder)

The bus bar holder 90 is made of an insulating resin member. The bus bar holder 90 is molded by insert molding of partially embedding the neutral point bus bar 10 and the plurality of phase bus bars 11, 12, and 13. Thus, the bus bar holder 90 holds the neutral point bus bar 10 and the phase bus bars 11, 12, and 13.

The bus bar holder 90 includes a holder main body portion 91, a plurality of (four in the present preferred embodiment) props 92, and a plurality of (five in the present preferred embodiment) partition walls 93. The bus bar holder 90 is mounted on the core back 21 of the stator core 20. The bus bar holder 90 is fixed to, for example, the stator core 20. The bus bar holder 90 may be fixed to the housing 1a (see FIG. 1).

The holder main body portion 91 embeds the neutral point bus bar main body portion 10a of the neutral point bus bar 10 and the phase bus bar main body portions 11a, 12a, and 13a of the phase bus bars 11, 12, and 13. The holder main body portion 91 exposes the neutral point connection portion 10b and the phase connection portions 11b, 12b, and 13b from an upper end surface.

The prop 92 extends upward from holder main body portion 91. The plurality of props 92 embed the upper extending portions 10c, 11c, 12c, and 13c of the neutral point bus bar 10 and the phase bus bars 11, 12, and 13, respectively. Thus, the props 92 support the upper extending portions 10c, 11c, 12c, and 13c.

The partition wall 93 extends along the radial direction and the axial direction. The plurality of partition walls 93 are arranged along the circumferential direction. In the bus bar unit 5, the neutral point connection portions 10b and each of the phase connection portions 11b, 12b, and 13b are alternately arranged two by two in the circumferential direction. The partition wall 93 is arranged between the neutral point connection portion 10b and each of the phase connection portions 11b, 12b, and 13b. Thus, the partition wall 93 can enhance the insulation between the neutral point connection portion 10b and the second end 64 of different phases and between each of the phase connection portions 11b, 12b, and 13b and the first end 63, and the reliability of the bus bar unit 5 can be enhanced.

Figure 10:
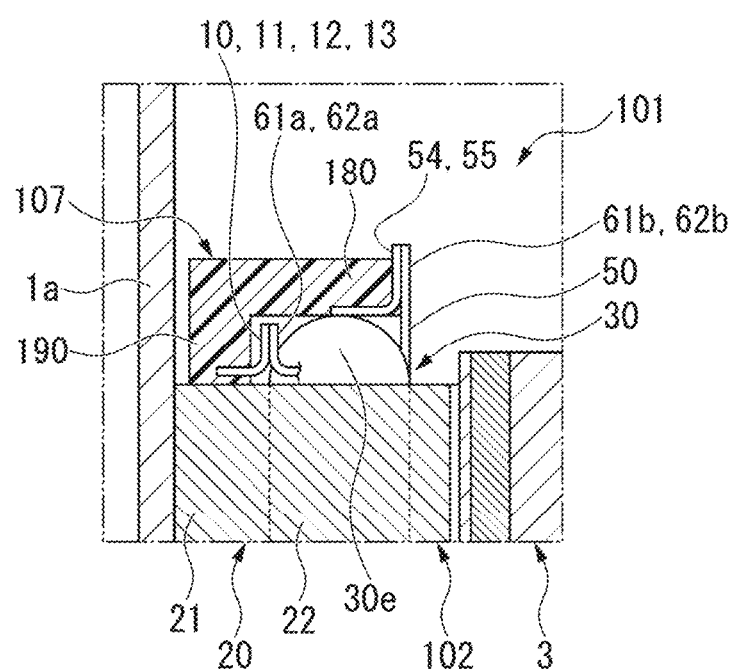
FIG. 10 is a sectional schematic view of a portion of a motor according to a modification.

FIG. 10 is a sectional schematic view of a portion of a motor 101 according to a modification.

The motor 101 of the present modification is mainly different from that of the above-described preferred embodiment in that a conductor holder portion (conductor holder) 180 and a bus bar holder portion (bus bar holder) 190 are configured using the same member (resin holder 107).

The plurality of bus bars 10, 11, 12, and 13 are arranged on the upper side of the core back 21 of the stator core 20 radially outward of the coil end 30e, which is similar to the above-described preferred embodiment. The folded conductors 54 and 55 are arranged immediately above the coil end 30e located above the stator core 20.

A stator 102 of the present preferred embodiment includes the resin holder 107. The resin holder 107 includes the conductor holder portion 180 and the bus bar holder portion 190. That is, the stator 102 includes the conductor holder portion 180 and the bus bar holder portion 190. The conductor holder portion 180 holds the plurality of folded conductors 54 and 55. Similarly, the bus bar holder portion 190 holds the plurality of bus bars 10, 11, 12, and 13.

The resin holder 107 is mounted on the core back 21 of the stator 102. The resin holder 107 is fixed to, for example, the stator core 20 in the conductor holder portion 180. The resin holder 107 may be fixed to the housing 1a.

According to the motor 101 of the present modification, the number of components can be reduced as compared with a case where members respectively holding the folded conductors 54 and 55 and members respectively holding the bus bars 10, 11, 12, and 13 are provided, and an assembly process can be simplified.

According to the resin holder 107 of the present modification, the conductor holder portion 180 that holds the plurality of folded conductors 54 and 55 and the bus bar holder portion 190 that holds the plurality of bus bars 10, 11, 12, and 13 are configured as the single member. Accordingly, as compared with a case where the conductor holder portion 180 and the bus bar holder portion 190 are individually arranged, the rigidity thereof can be increased, and vibration applied to the folded conductors 54 and 55 and the bus bars 10, 11, 12, and 13 can be suppressed. As a result, a load applied to a joint portion such as a welded portion can be reduced, and the reliability of the stator 102 can be enhanced.

Although the case where the conductor holder portion 180 and the bus bar holder portion 190 are configured using the single member has been described in the present modification, it is possible to obtain a certain effect of suppressing the vibration applied to the folded conductors 54 and 55 and the bus bars 10, 11, 12, and 13 if the bus bar holder portion 190 supports the conductor holder portion 180. That is, the bus bar holder portion 190 and the conductor holder portion 180 are not necessarily the single member as long as the bus bar holder portion 190 and the conductor holder portion 180 are fixed to each other.

Although various preferred embodiments of the present invention have been described above, configurations in the respective embodiments and a combination thereof are examples, and thus, addition, omission, replacement of configurations, and other modifications can be made within a range without departing from the spirit of the present invention. In addition, the present invention is not to be limited by the preferred embodiments. For example, the case where the motor 1 is the three-phase motor has been described in the preferred embodiment, but another motor such as a five-phase motor may be adopted.

For example, the case where the first end portion 61a of the first portion 61 and the third end portion 62a of the second portion 62 are arranged radially outward of the coil end 30e, and the second end portion 61b of the first portion 61 and the fourth end portion 62b of the second portion 62 are arranged radially inward of the coil end 30e has been described in the above-described preferred embodiment. However, the radially inward or outward relationship of the first end portion 61a, the second end portion 61b, the third end portion 62a, or the fourth end portion 62b with respect to the coil end 30e may be opposite to that in the preferred embodiment. That is, the first end portion 61a of the first portion 61 and the third end portion 62a of the second portion 62 may be arranged radially inward of the coil end 30e, and the second end portion 61b of the first portion 61 and the fourth end portion 62b of the second portion 62 may be arranged radially outward of the coil end 30e. In this case, the folded conductors 54 and 55 are connected to other conductors at end portions radially outward of the coil end 30e. In addition, the bus bars 10, 11, 12, and 13 are connected to the winding portion 30 radially inward of the coil end 30e.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
 a rotor rotatable about a central axis;
 a stator arranged radially outward of the rotor, wherein the stator includes:
  a stator core having a plurality of slots arranged in a circumferential direction; and
  a plurality of conductor connection bodies which have a plurality of conductors connected in series and are inserted into the plurality of slots, wherein the plurality of conductor connection bodies are classified into a plurality of phases,
 each conductor connection body of the plurality of conductor connection bodies includes:
  a first portion of the conductor connection body, wherein the first potion of the conductor connection body is wave-wound toward one side in the circumferential direction from a first end portion to a second end portion;
  a second portion of the conductor connection body, wherein the second potion of the conductor connection body is wave-wound toward the one side in the circumferential direction from a third end portion to a fourth end portion;
  a folded portion connecting the first portion of the conductor connection body and the second portion of the conductor connection body;
  a phase bus bar connected to the first end portion; and
  a neutral point bus bar connected to the third end portion,
 the second end portion of the first portion of the conductor connection body and the fourth end portion of the second portion of the conductor connection body protrude in an axial direction from the slots different from each other in the circumferential direction, and
 the plurality of conductors include folded conductors connecting the second end portion of the first portion of the conductor connection body and the fourth end portion of the second portion of the conductor connection body and forming the folded portion, wherein a first folded conductor of the folded conductors partially overlaps a second folded conductor of the folded conductors in the axial direction, the first folded conductor overlaps less than an entirety of the second folded conductor in the axial direction, the first folded conductor is of a first phase, and the second folded conductor is of a second phase different from the first phase.

2. The motor according to claim 1, wherein
 the first end portion, the second end portion, the third end portion, and the fourth end portion all protrude to one side in the axial direction from the stator core, and
 the folded conductors are arranged between the first end portion and the second end portion in a radial direction.

3. The motor according to claim 1, wherein
 at least parts of the folded conductors of different phases overlap each other when viewed from the axial direction.

4. The motor according to claim 3, wherein the folded conductors of different phases have a mutually identical shape and are arranged to be shifted from each other in the circumferential direction.

5. The motor according to claim 4, wherein the folded conductors of different phases are arranged in a stepwise manner when viewed from the radial direction.

6. The motor according to claim 1, wherein
the plurality of conductor connection bodies include a plurality of conductor connection bodies of an identical phase, and
the folded conductors of the identical phase overlap each other in the radial direction.

7. The motor according to claim 6, wherein
each folded conductor of the folded conductors includes:
   a conductor main body portion extending along the circumferential direction;
   a radially extending portion extending in the radial direction from each of both end portions of the folded conductor of the conductor main body portion; and
   a connection terminal extending in the axial direction from an end portion of the radially extending portion, and
the folded conductors of the identical phase overlap each other in the radial direction in the conductor main body portion.

8. The motor according to claim 7, wherein each folded conductor of the folded conductors has a plate shape having the axial direction as a plate thickness direction in the conductor main body portion and the radially extending portion, and the radial direction as the plate thickness direction in the connection terminal.

9. The motor according to claim 6, wherein
s represents a number of slots per pole, and
in two of the conductor connection bodies of an identical phase passing through the slots adjacent to each other,
one conductor connection body extends between the slots separated by s−1 at the folded conductor, and
another conductor connection body extends between the slots separated by s+1 at a corresponding folded conductor of the folded conductors and passes through one side in the radial direction of the folded conductor of the one conductor connection body.

10. The motor according to claim 1, wherein
the stator includes a conductor holder that holds the folded conductors of the plurality of conductor connection bodies,
the plurality of conductor connection bodies are classified into a plurality of phases,
connection terminals connected to the conductors other than the folded conductor are provided at both end portions of each of the folded conductors, and
the conductor holder has a wall arranged between the connection terminals of adjacent folded conductors of the folded conductors of different phases.

11. The motor according to claim 10, wherein
the stator includes:
   ; and
   a bus bar holder that holds the neutral point bus bar and the phase bus bar, and the bus bar holder supports the conductor holder.

12. The motor according to claim 11, wherein the bus bar holder and the conductor holder are configured as a single member.

* * * * *